United States Patent [19]

Chea, Jr.

[11] Patent Number: 4,656,659
[45] Date of Patent: Apr. 7, 1987

[54] PROGRAMMABLE RING SIGNAL GENERATOR

[75] Inventor: Ramon C. W. Chea, Jr., Monroe, Conn.

[73] Assignee: ITT Corporation, New York, N.Y.

[21] Appl. No.: 756,879

[22] Filed: Jul. 18, 1985

[51] Int. Cl.⁴ ...................... H04M 3/02; H04M 19/02
[52] U.S. Cl. ...................................... 379/253; 379/255
[58] Field of Search ......... 179/18 HB, 51 AA, 84 VF

[56] References Cited

U.S. PATENT DOCUMENTS 4,115,660 9/1978 Croisier et al. ............ 179/18 HB X
4,349,703 9/1982 Chea, Jr. ......................... 179/18 HB Primary Examiner—James L. Dwyer
Attorney, Agent, or Firm—Peter C. Van Der Sluys

[57] ABSTRACT

A digitally controlled ring signal generator includes a plurality of ring signal generating sources providing a plurality of inputs to each of a plurality of ring circuits. Each input is an a.c. signal superimposed on a d.c. bias that is greater than or equal to the peak voltage of the a.c. signal.

9 Claims, 13 Drawing Figures

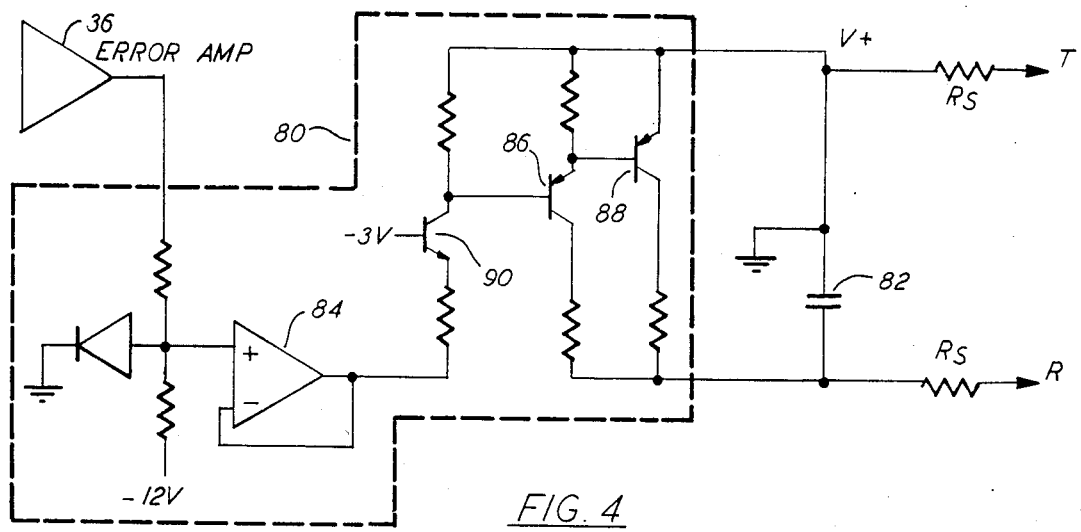
FIG. 4
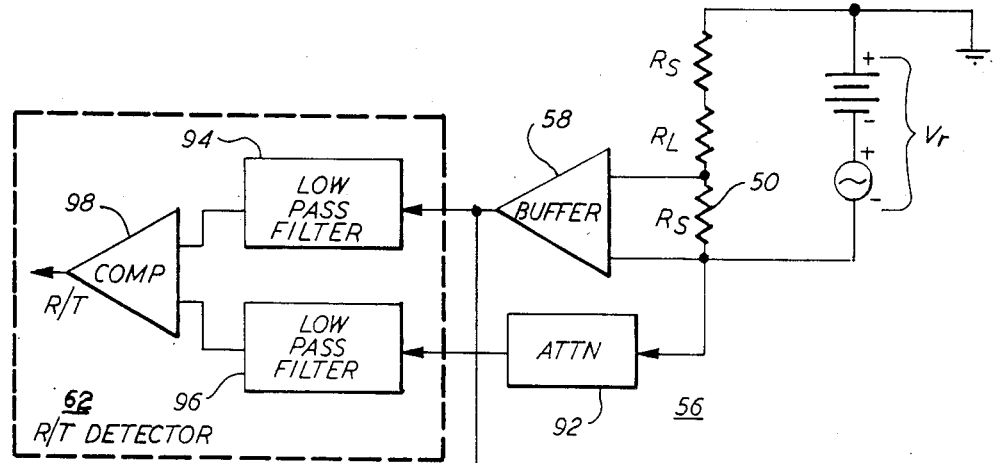
FIG. 6
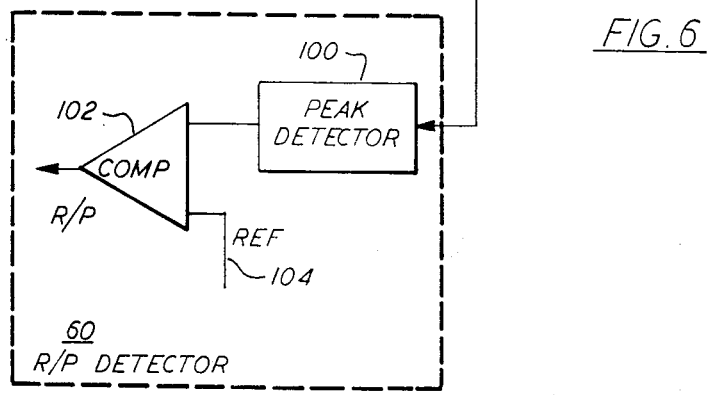

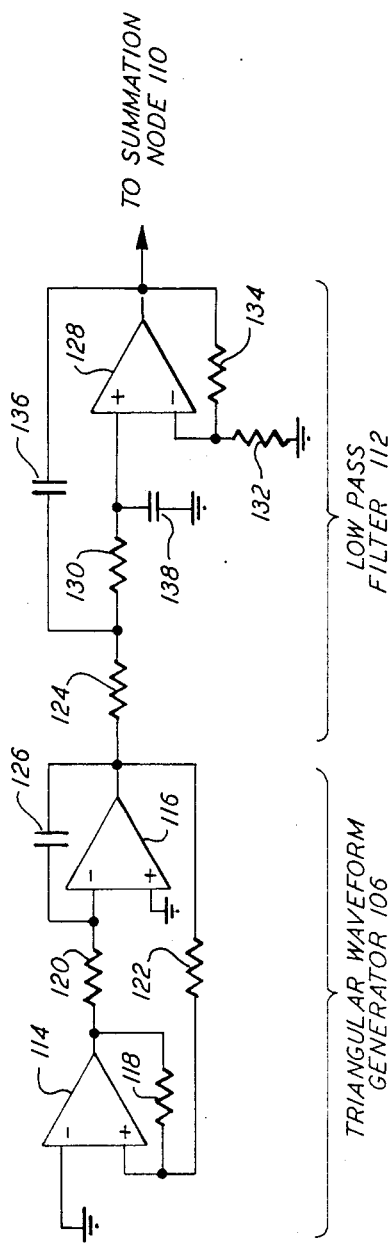
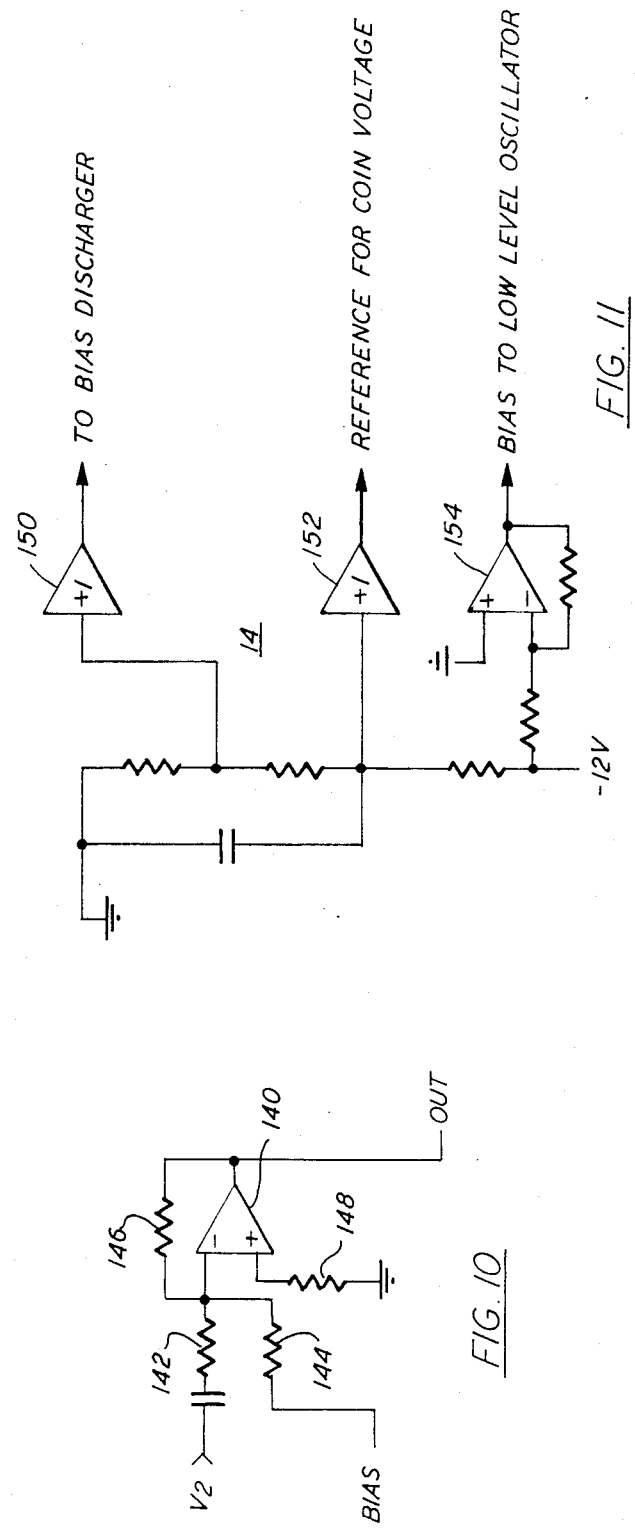
FIG. 9
FIG. 10
FIG. 11

PROGRAMMABLE RING SIGNAL GENERATOR

BACKGROUND OF THE INVENTION

The present invention generally relates to a digitally controlled ring signal generator and, in particular, relates to such a ring signal generator that is both inexpensive and simplistic in the implementation thereof.

In nearly all digital telephone switching systems, a ring circuit is required for each of many groups of subscriber lines interconnected via a digital switching network. Thus, one of the major costs in providing telecommunication services to a very large number of subscribers is dedicated to the line circuits. In fact, considerable effort is continuously being dedicated to both reducing the cost of such line circuits as well as increasing the number of subscriber lines serviced by each circuit.

In recent years, electronic ringing circuits have been developed. This work has been directed at utilizing modern solid state technology and circuit techniques to reduce power requirements and the physical size of components to increase packing density and thereby provide a less expensive circuit.

One example of this technological trend is made clear in U.S. Pat. No. 4,349,703 entitled, "Programmable Ring Signal Generator" issued Sept. 14, 1982 and assigned to the assignee hereof. The above-identified patent is deemed incorporated herein by reference. Therein a digitally controlled ring signal generator is described wherein each ringing circuit services about thirty different subscribers. The operation of the device described therein depends upon the use of a ring signal reference source having two distinct output signals; i.e. a d.c. biased sine wave and a rectified square wave. From these signals, a high voltage sinusoidal ring signal is reconstructed via high voltage commutating switches. The reconstructed signal is then provided, under the control of a ring supervision circuit, to a subscriber line/trunk.

While such a device significantly reduces the bulk and expense of servicing subscriber line/trunk by eliminating the need for rather bulky transformers it, in itself, is somewhat costly because of the need for high voltage commutating switches.

SUMMARY OF THE INVENTION

Accordingly, it is one object of the present invention to provide a programmable ring signal generator that is less costly and comparatively simplified in view of prior art signal generator circuits.

This object is accomplished, at least in part, by providing a complete ringing circuit without the use of bulky transformers or expensive commutating switches.

Other objects and advantages will become apparent to those skilled in the art from the following detailed description read in conjunction with the attached claims and the drawings appended hereto.

BRIEF DESCRIPTION OF THE DRAWINGS

FIG. 4 is a schematic of a discharge circuit used with the present invention;

FIG. 6 is a block diagram of a ring supervision circuit useful with the present invention;

FIG. 9 is a schematic of a ring oscillator useful with the present invention;

FIG. 10 is a typical summation node useful in conjunction with the present invention; and FIG. 11 is a schematic diagram of a d.c. voltage generator circuit useful with the present invention.

DETAILED DESCRIPTION OF THE INVENTION

Figure 1:
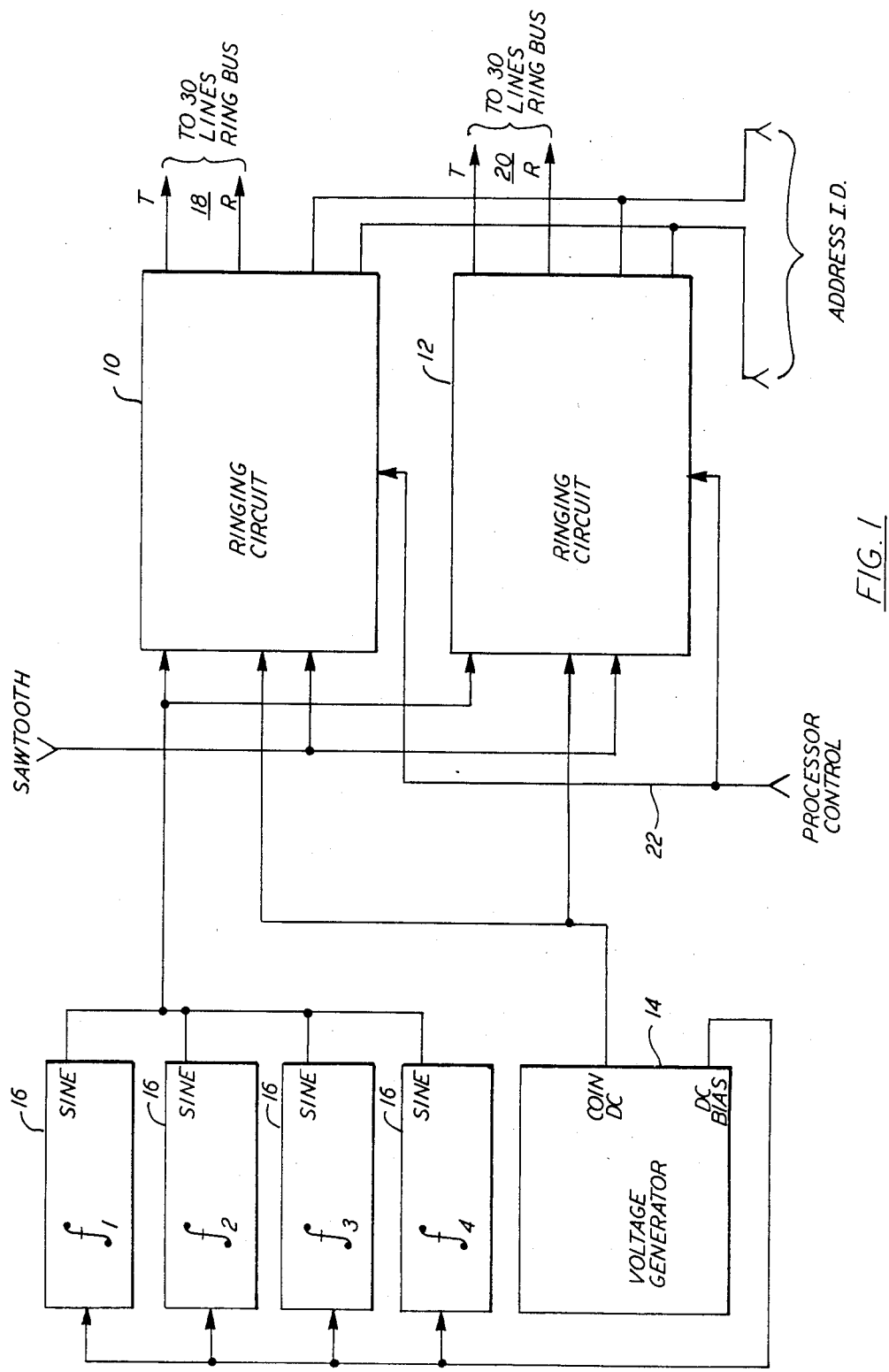
FIG. 1 is a shared ringing circuit configuration wherein the ring signal generator of the present invention can be advantageously employed.

The organization of a pair of ringing circuits, generally indicated at 10 and 12 in FIG. 1, and embodying the principles of the present invention, are configured in a shared ringing architecture such that the same ringing circuits, 10 or 12, are shared over a plurality or subscriber lines/trunks. One such shared architecture is fully described and discussed in U.S. Pat. No. 4,435,803, issued on Mar. 6, 1984 to Das et al. entitled, "Analog Subscriber/Trunk Module With Shared Ringing Source and Ring-Trip". This patent is assigned to the assignee hereof and deemed incorporated herein by reference.

Figure 5:
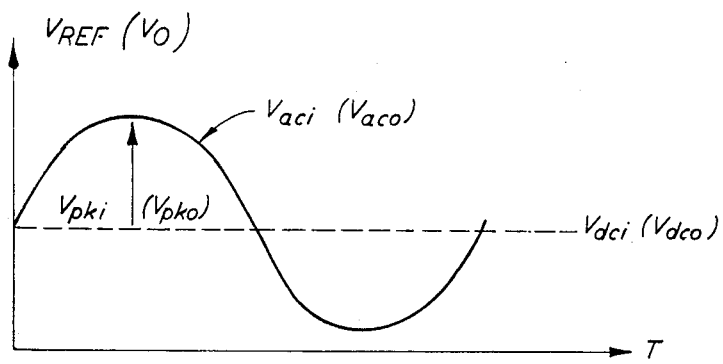
FIG. 5 is a waveform useful in the description of the present invention.

The present application relates to the details of such ringing circuits 10 and 12, and a voltage generator 14 shown therein. FIG. 1 is provided for a more complete description of one environment wherein the present invention is particularly useful. In operation, the ring circuits, 10 and 12, effectively function as buffer amplifiers that translate low level signals, received from a plurality of ring signal reference sources 16 and a d.c. signal source from the voltage generator 14, into high voltage/power signals required for telephone ringing. In one preferred architecture each ringing circuit, 10 and 12, provides ringing signals to a group of 30 subscriber lines/trunks by means of a common ring bus having the ringing circuits, 10 and 12, coupled thereto via lines, 18 and 20, respectively. Each ringing circuit, 10 and 12, provides, for example, one of four a.c. signals having frequencies, $f_1$, $f_2$, $f_3$, or $f_4$, of a fixed amplitude superimposed upon a positive d.c. bias and provided to the ringing circuits, 10 and 12, under the control of a microprocessor interface bus 22. As more fully discussed below, the d.c. bias can be any value greater than or equal to the peak amplitude of the a.c. signals. This is ensured by maintaining Vpki less than Vdci, as shown in FIG. 5.

It is sufficient for a complete understanding of the present invention to note that the control signal on bus 22 is a logic signal and the specific programming, per se, of the microprocessor is not considered part of the present invention. It is also understood that the ringing circuits, 10 and 12, of the present invention can provide signals useful for purposes other than telephone ringing, per se, such as d.c. voltages for use in coin operated telephone controls.

Each of the ring signal reference sources 16 provides a distinct a.c. signal of a particular frequency selected from $f_1$, $f_2$, $f_3$ and $f_4$ at the output thereof. This a.c. signal is d.c. biased by a d.c. voltage from voltage generator 14 that is greater than or equal to the peak amplitude of the reference voltage from the ring signal reference sources 16. This condition is graphically illustrated in FIG. 5 and must be satisfied in order to provide a substantially distortion free a.c. signal. The d.c. voltage generator 14 provides the d.c. biasing voltages and is discussed in greater detail hereinafter.

Figure 2:
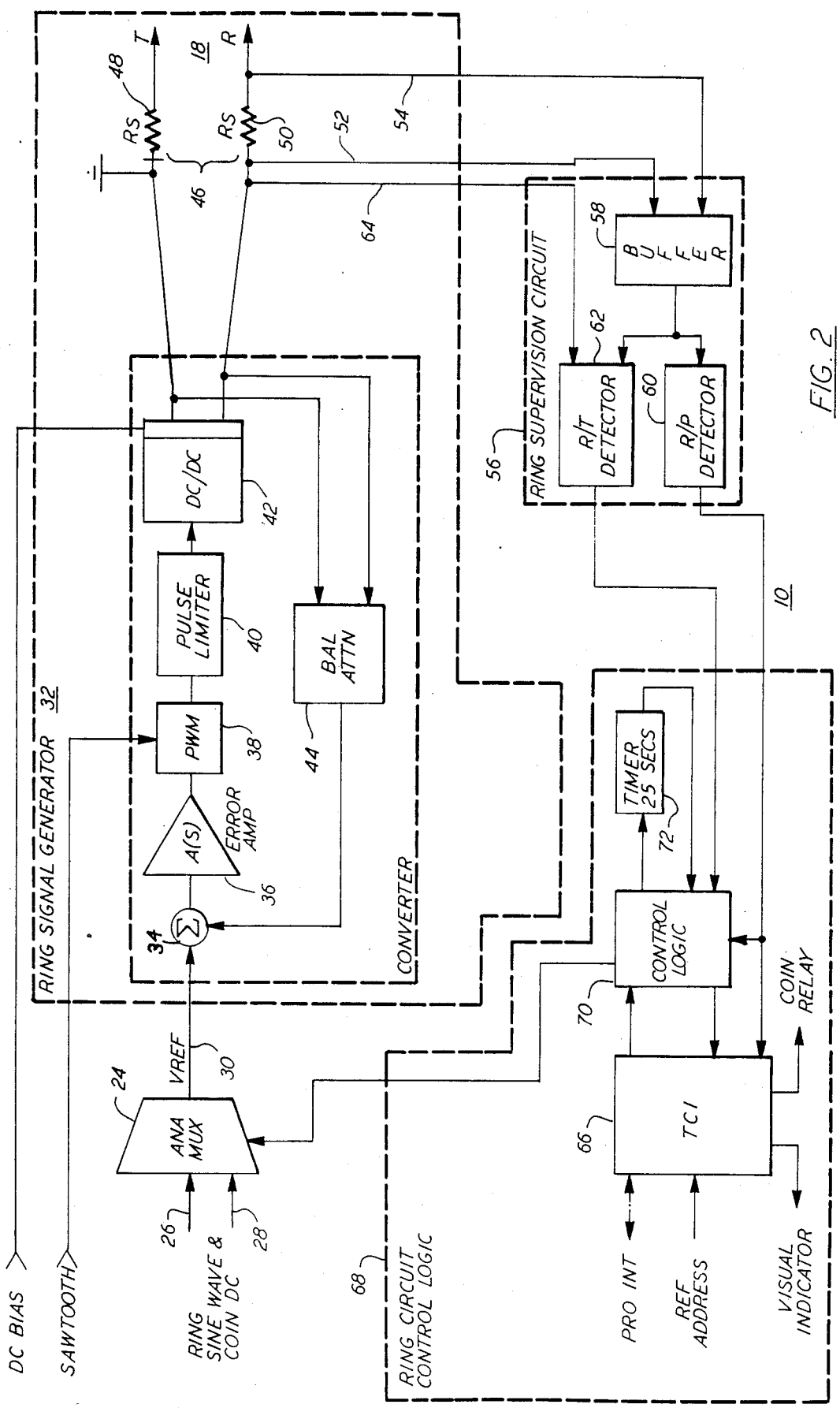
FIG. 2 is a functional block diagram of a ringing circuit useful with the present invention.

A functional block diagram of the ringing circuit 10 is illustrated in FIG. 2. An analog multiplexer 24, under microprocessor control, selects a ring signal reference source output sinusoidal signal on one of four input lines 26 (another line 28 is included for a d.c. signal input) and provides voltage reference signal on output line 30 to a ring signal generator 32, that functions as a d.c./d.c. flyback converter. The ring signal generator 32 includes a summer 34, an error amplifier 36, a pulse width modulator 38, a pulse limiter 40, a d.c. to d.c. converter 42 and a balanced attenuator 44. The ring signal generator 32 is described in more detail with reference to FIG. 3. The ring signal generator 32 is coupled to the telephone subscriber tip and ring lines 18. A typical subscriber line connection is illustrated at 46. Resistors 48 and 50 function as current sensors and for current limiting and surge protection.

The supervisory control signal on lines 52 and 54, coupled to ring supervisory circuit 56, are derived by sensing the current flow in the subscriber loop through sensing resistor 50, the current is then detected by buffer 58. The sensed signal coupled to buffer 58 may include a.c. only or both a.c. and d.c. components. Subscriber Off-Hook signal (ring-trip) is obtained by filtering out the a.c. component and comparing the remaining d.c. signal with a reference d.c. signal derived directly from the signal source. This is preferably accomplished in ring supervision circuit 56, which is equivalent to a bridge circuit with high precision and insensitivity to source voltage variation. Ringing current presence detector 60 detects ring current in the subscriber loop from the output of buffer 58 by feeding the output signal to a peak detector circuit; the output of which peak detector is compared to a reference signal which defines the threshold for a positive current present condition. Ring trip detector circuit 62 detects ring-trip via line 64 and the output of buffer 58. Ring presence and ring-trip signals are coupled to the processor via termination control interface circuit 66, which provides the communication interface between the processor and the ring circuit and which is a portion of the ring circuit control logic 68. Control logic 70 checks the data integrity of the data instructions received by the termination control interface 66 from the processor, and energizes ring signal generator 32 upon receipt of a positive polarity signal. A security timer 72 limits the energization to about 2.5 seconds to protect the ringing circuit from damage which could result from a prolonged ringing interval caused, for example, by faulty data.

Figure 3:
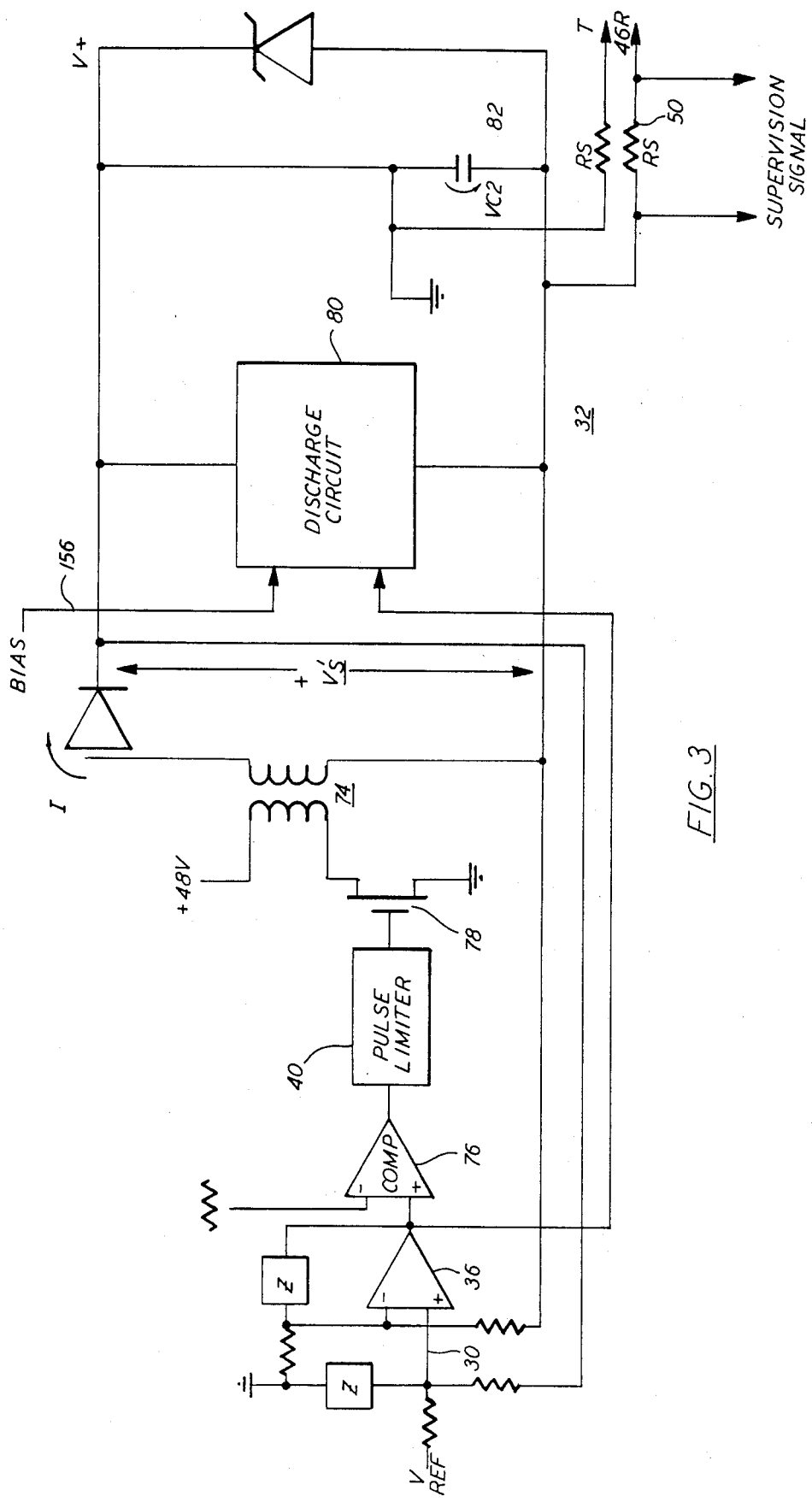
FIG. 3 is a more detailed schematic of a ring signal generation circuit embodying the principles of the present invention.

Referring now to FIG. 3, a detailed schematic of ringing signal generator 32 is illustrated. To generate a ringing signal by energizing ringing circuit 10, the analog multiplexer 24 output, Vref, illustrated in FIG. 5, is coupled to error amplifier 36 on line 30 with a feedback signal on the other input derived from the output V's of a small d.c./d.c. converting ferrite pulse transformer 74. A 97.52 kHz sawtooth waveform is coupled to one input of comparator 76 and the output of amplifier 36 is coupled to the positive input of comparator 76, that functions as the pulse width modulator 38; the output being coupled to pulse limiter 40 and then to the gate of FET 78 for amplification prior to d.c./d.c. conversion by ferrite pulse transformer 74 to V's.

Current flowing in the subscriber loop is detected by ring present detection circuit 60. Detection of Off-Hook causes an Off-Hook status signal to be coupled to the microprocessor and the initiation of ringing signal removal process. Ring removal is accomplished by changing Vref to zero. When current in sense resistor 50 has subsided, as indicated by the logic state of the output of 60 (described in greater detail with reference to FIGS. 6 and 7), a command from the microprocessor to release the ring relay in the line circuit is obtained, achieving dry-switching. A similar shut-down procedure is implemented at the conclusion of each ringing interval. The ringing cadence, i.e. the provision of a burst of ringing signal at a predetermined time interval, may be governed by processor software or other command origination, by turning ring circuit 10 ON and OFF at specific intervals.

A preferred discharge circuit 80 in parallel with capacitor 82 is illustrated in FIG. 4. The output of error amplifier 36 is coupled to one input of operational amplifier 84 that distributes the total discharge power between the transistors, 86 and 88. Transistor 90 has a $-3$ volt base bias having the collector thereof tied to the base of amplifier 86. The amplified output voltage V is discharged through capacitor 82 to provide a smooth discharge transition. The amount of discharging current is proportional to the error signal from amplifier 36.

A block diagram of a ring supervision circuit 56 is illustrated in FIG. 6. Ringing voltage and current voltage is sensed across resistor 50 and coupled to ring-trip detector 62 via buffer 58 and attenuator 92, low pass filtered by filters 94 and 96 and coupled to the inputs of comparator 98; the output of comparator 98 being a logical ring-trip signal. Essentially, ring-trip is obtained by filtering out the a.c. components and comparing the remaining d.c. to a reference extracted from the source. Ring presence detector 60 detects the presence of ringing current from the output of buffer 58, coupling the output of buffer 58 to a peak detector 100; the output thereof being compared in comparator 102 to a reference signal on line, that defines a threshold for a positive current present condition.

A typical ring-trip detector 62 useful herewith is discussed and described in the aforementioned U.S. Pat. No. 4,349,703. In addition, a typical control logic circuit 70 and security timer 72 is also shown and discussed therein. The only significant difference being that the control logic 70 as used herein would not require the square wave input $f_{sq1}$, $f_{sq2}$, $f_{sq3}$ and $f_{sq4}$ described therein.

Figure 7:
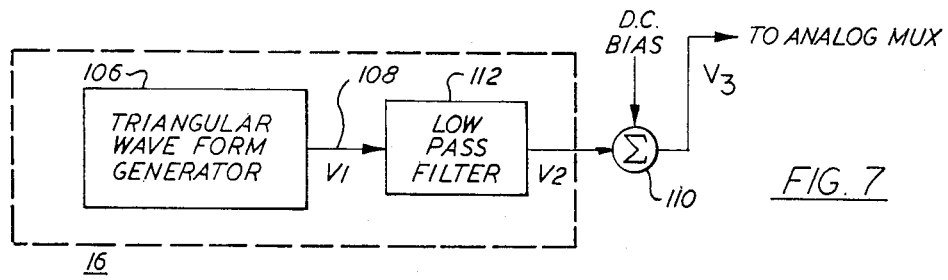
FIG. 7 is a block diagram of a ring signal reference source useful with the present invention.
Figure 8A:
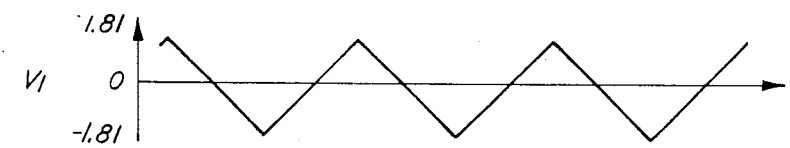
FIGS. 8A through 8C are waveforms useful in describing the operation of the ring signal reference source illustrated in FIG. 7.
Figure 8B:
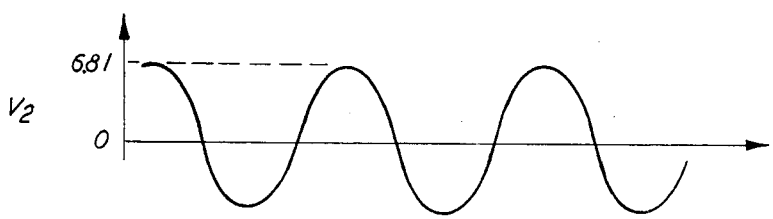
Figure 8C:
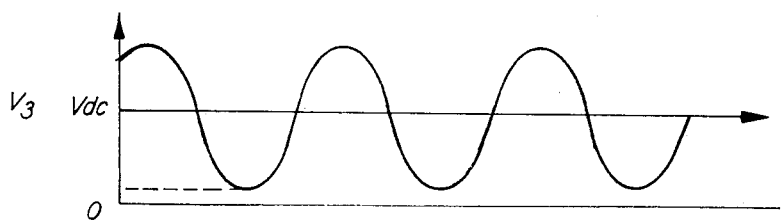

A ring signal reference source 16 is illustrated in functional block diagramatic form in FIG. 7. FIGS. 8(A), 8(B), and 8(C) illustrate various waveforms appearing at critical points in the block diagram of FIG. 7 that are helpful in understanding the operation of the ring signal reference source 16. Triangular waveform generator 106 generates waveform $V_1$ as an output on line 108, and passed through low pass filter 112 resulting in waveform $V_2$ illustrated by waveform 8(B). Signal $V_2$ is summed at summation node 110 with a d.c. bias signal and has a summed output $V_3$, illustrated by waveform 8(C).

FIG. 9 illustrates a detailed schematic of the ring oscillator circuit including a triangle waveform generator 106 and low-pass filter 112 of FIG. 7. Operational amplifiers, 114 and 116, are biased by resistors 118, 120, 122 and 124, and capacitor 126 generate $V_1$ illustrated, at FIG. 8(A), i.e. a triangular waveform having a peak amplitude of about 1.8 volts. The voltage at the output of operational amplifier 114 is a square wave having an amplitude defined by the saturation of the operational amplifiers, 114 and 116. Voltage $V_1$ is coupled to the low-pass filter 112 at the positive going input of operational amplifier 128 biased by resistors 130, 132 and 134, and capacitors, 136 and 138. The output of operational amplifier 128 is $V_2$ illustrated by FIG. 8(B), which is a sine wave. Frequency adjustment is accomplished by varying resistor 120, the Q of filter 112 is 1.5873 with a center frequency determined by the values of the resistors, 124 and 130. The d.c. gain is 2.373, using exemplary values.

Referring now to FIG. 10, a schematic of the summation node 110 of FIG. 7 is illustrated. Sine wave $V_2$ is coupled to operational amplifier 140, biased via resistors, 142, 144, 146 and 148. The a.c. signal amplitude is adjustable via resistor 142 and the d.c. amplitude is adjustable via resistor 144.

Referring now to FIG. 11, a schematic of a typical d.c. voltages generation circuit 14 shown in FIG. 1 is illustrated. This circuit derives the various d.c. voltages needed for biasing the various components within the ringing signal generator and includes operational amplifiers 150, 152, and 154 that generate, respectively, the bias to discharger 80 on line 156, reference bias for coin voltage and bias to low level oscillators.

Although the present invention has been described in connection with a specific embodiment thereof, it is understood that configurations and arrangements are possible that are nevertheless included within the scope and spirit of the invention as defined by the appended claims and the reasonable interpretation thereof.

What is claimed is:

1. A digitally controlled ring signal generator, comprising:
    means for generating a ring signal including a d.c. to d.c. flyback converter for selectively amplifying one of a plurality of low level ringing signals, each of said plurality of ringing signals having a unique frequency whereby immediate ringing is available to one or more subscriber lines;
    means for sensing a loop current connected directly to said d.c. to d.c. flyback converter;
    means, responsive to said sensed loop current, for generating ringing supervisory signals;
    means, responsive to said generating ringing supervisory signals and an external data input, for providing an output control signal; and
    a ring signal reference source, said ring signal reference source being responsive to said output control signal, for coupling said ringing signals to said ring signal generating means whereby the characteristics of said ringing signals are selectable in accordance with said external data input and the presence or absence of said generated ringing signals being determined by said ringing supervisory signals, said ring signal reference source having a d.c. voltage source and a sinusoidal voltage source, said d.c. voltage source having a fixed voltage potential, said fixed voltage potential being greater than or equal to the peak amplitude of said sinusoid.

2. A digitally controlled ring signal generator as claimed in claim 1 wherein said d.c. to d.c. converter includes a ferrite pulse transformer.

3. A digitally controlled ring signal generator as claimed in claim 1 wherein said external data input is comprised of processor output control data, said output control data being variable in accordance with the programming of said processor.

4. A digitally controlled ring signal generator as claimed in claim 3 wherein said means for providing an output control signal includes means for generating a ring circuit energizing signal for selectively enabling and disabling said ring signal generation circuit means.

5. A digitally controlled ring signal generator as claimed in claim 1 wherein said ring supervision circuit means includes ring-trip detection means responsive to subscriber OFF-Hook signal, and a ring presence detector means responsive to loop current sensing means, said ring trip detection means and said ring presence detector means each having an output corresponding to said ringing supervisory signals.

6. A digitally controlled ring signal generator as claimed in claim 5 wherein said ring-trip detection means comprises:
    low-pass filter means having said sensed loop current coupled thereto and having an a.c. filtered output; and
    comparator means for comparing said a.c. filtered output to a reference signal for generating a ring-trip signal output.

7. A digitally controlled ring signal generator as claimed in claim 5 wherein said ring presence detector means comprises:
    peak detector means having a signal representative of said sensed loop current coupled thereto and having an output; and
    comparator means for comparing the output of said peak detector means to a reference and for generating a ring presence signal output in response to said comparison.

8. A digitally controlled ring signal generator, comprising:
    a ring signal reference source for generating a plurality of ringing signals each having a unique frequency and provided as a d.c. biased sinusoidal voltage wherein the d.c. bias potential is greater than or equal to the peak amplitude of said sinusoidal voltage;
    means responsive to a digital control signal for selecting one of said ringing signals;
    means responsive to the selected ringing signal for generating a ring signal, said ring signal generating means including a d.c. to d.c. flyback converter for amplifying said d.c. biased sinusoidal ringing signal from a low amplitude to a high amplitude without distorting the sinusoidal characteristic; and
    means for coupling said high amplitude sinusoidal ringing signal directly to a ring signal bus, whereby the sinusoidal ringing signal from the ring signal reference source is biased to a selected polarity so that it may pass through the d.c. to d.c. flyback converter without the usual distortion created by a polarity reversal and the amplified signal can be provided directly to the ring signal bus.

9. A method of providing a ring signal, comprising the steps of:
    generating a sinusoidal ring signal of selected frequency;

biasing said sinusoidal ring signal with a selected polarity d.c. voltage so that the sinusoidal signal does not reverse polarity;

amplifying said d.c. biased sinusoidal ring signal using a d.c. to d.c. flyback converter; and providing said amplified d.c. biased sinusoidal ring signal directly to a ring signal bus.

* * * * *